United States Patent
Akelbein et al.

(10) Patent No.: US 9,785,791 B2
(45) Date of Patent: *Oct. 10, 2017

(54) USING A LOCATION AUTHORIZATION EXTENSION TO PROVIDE ACCESS AUTHORIZATION FOR A MODULE TO ACCESS A COMPUTING SYSTEM

(71) Applicant: International Business Machines Corporation, Armonk, NY (US)

(72) Inventors: Jens-Peter Akelbein, Nackenheim (DE); Wolfgang Mueller-Friedt, Meisenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,124

(22) Filed: Feb. 25, 2016

(65) Prior Publication Data

US 2016/0180110 A1 Jun. 23, 2016

Related U.S. Application Data

(63) Continuation of application No. 14/559,850, filed on Dec. 3, 2014, now Pat. No. 9,344,435, which is a (Continued)

(30) Foreign Application Priority Data

Dec. 1, 2011 (EP) ..................................... 11191490

(51) Int. Cl.
*G06F 15/16* (2006.01)
*H04L 29/06* (2006.01)
(Continued)

(52) U.S. Cl.
CPC .......... *G06F 21/6218* (2013.01); *G06F 21/30* (2013.01); *G06F 21/31* (2013.01); *H04L 63/107* (2013.01); *G06F 2221/2111* (2013.01)

(58) Field of Classification Search
CPC ............. H04L 63/1416; H04L 63/1408; H04L 63/1441; H04L 63/1458; G06F 21/552
(Continued)

(56) References Cited

U.S. PATENT DOCUMENTS 8,571,541 B2 10/2013 Seligmann et al.
9,031,534 B2 5/2015 Seligmann et al.
(Continued)

FOREIGN PATENT DOCUMENTS

| CN | 1722048 A | 1/2006 |
|---|---|---|
| CN | 102143149 A | 8/2011 |
| WO | 2010059673 | 5/2010 |

OTHER PUBLICATIONS

L. Youseff et al., "Toward a Unified Ontology of Cloud Computing", Grid Computing Environments Workshop, dated 2008, pp. 1-11.
(Continued)

*Primary Examiner* — Evans Desrosiers
(74) *Attorney, Agent, or Firm* — David W. Victor; Konrad, Raynes, Davda and Victor LLP

(57) ABSTRACT

Provided are a method, system, and computer program product for a local authorization extension to provide access authorization for a module to access a computing system. A memory stores information on a first validity range comprising position coordinates for a module seeking to access the computing system and a second validity range comprising position coordinates for a location authorization extension for a computing system. A determination is made of a first position signal from a first receiver of the module and of a second position signal from a second receiver of the
(Continued)

location authorization module. Determinations are made as to whether the first position signal is within the first validity range and whether the second position signal is within the second validity range. The module is granted access to the computing system in response to determining that the first position signal is within the first validity range and the second position signal is within the second validity range.

16 Claims, 5 Drawing Sheets

Related U.S. Application Data continuation of application No. 13/686,819, filed on Nov. 27, 2012, now Pat. No. 8,990,899.

(51) Int. Cl.
*G06F 21/62* (2013.01)
*G06F 21/30* (2013.01)
*G06F 21/31* (2013.01)

(58) Field of Classification Search
USPC ......... 713/168–174, 182–186, 202; 709/206, 709/225, 229, 249, 389; 726/2–8
See application file for complete search history.

(56) References Cited

U.S. PATENT DOCUMENTS

| | | | |
|---|---|---|---|
| 2003/0225893 A1 | 12/2003 | Roese et al. | |
| 2006/0014532 A1 | 1/2006 | Seligmann et al. | |
| 2006/0179311 A1* | 8/2006 | McCorkle | G01S 7/023 713/168 |
| 2008/0022003 A1 | 1/2008 | Alve | |
| 2009/0276771 A1 | 11/2009 | Nickolov et al. | |
| 2010/0132016 A1 | 5/2010 | Ferris | |
| 2011/0072486 A1 | 3/2011 | Hadar et al. | |
| 2011/0083161 A1 | 4/2011 | Ishida et al. | |
| 2011/0126197 A1 | 5/2011 | Larsen et al. | |
| 2011/0153727 A1 | 6/2011 | Li | |
| 2012/0167180 A1* | 6/2012 | Lee | G06F 21/31 726/4 |
| 2013/0007729 A1* | 1/2013 | Sirotkin | G06F 9/4445 718/1 |
| 2013/0145433 A1 | 6/2013 | Akelbein et al. | |
| 2014/0051389 A1 | 2/2014 | Seligmann et al. | |

OTHER PUBLICATIONS

L. Yan et al., "Strengthen Cloud Computing Security with Federal Identity Management Using Hierarchical Identity-Based Cryptography", dated 2009, pp. 1-12, Springer-Verlag Berlin Heidelberg.
Office Action, dated Feb. 25, 2014, for U.S. Appl. No. 13/686,819, filed Nov. 27, 2012, invented by Dr. Jens-Peter Akelbein et al., Total 14 pgs.
Response to Office Action, dated May 27, 2014, for U.S. Appl. No. 13/686,819, filed Nov. 27, 2012, invented by Dr. Jens-Peter Akelbein et al., Total 12 pgs.
Final Office Action, dated Aug. 21, 2014, for U.S. Appl. No. 13/686,819, filed Nov. 27, 2012, invented by Dr. Jens-Peter Akelbein et al., Total 10 pgs.
Response to Final Office Action, datedOct. 21, 2014, for U.S. Appl. No. 13/686,819, filed Nov. 27, 2012, invented by Dr. Jens-Peter Akelbein et al., Total 12 pgs.
Notice of Allowance, dated Nov. 13, 2014. for U.S. Appl. No. 13/686,819, filed Nov. 27, 2012, invented by Dr. Jens-Peter Akelbein et al., Total 28 pgs.
Information Materials for IDS, dated Apr. 28, 2015, Total 4 pages.
Machine Translation for CN1722048A, published Jan. 18, 2006, Total 20 pages.
Machine Translation for CN102143149A, published Aug. 3, 2011, Total 15 pages.
8571541 is an English counterpart to CN1722048.
9031534 is an English counterpart to CN1722048.
20060014532 is an English counterpart to CN1722048.
20140051389 is an English counterpart to CN1722048.
US Patent Application, dated Nov. 27, 2012, for U.S. Appl. No. 13/686,819, filed Nov. 27, 2012, invented by Dr. Jens-Peter Akelbein et al., Total 31 pages.
US Patent Application, dated Dec. 3, 2014, for U.S. Appl. No. 14/559,850, filed Dec. 3, 2014, invented by Dr. Jens-Peter Akelbein et al., Total 31 pages.
Preliminary Amendment, dated Dec. 3, 2014, for U.S. Appl. No. 14/559,850, filed Dec. 3, 2014, invented by Dr. Jens-Peter Akelbein et al., Total 10 pages.
Office Action, dated Jul. 8, 2015, for U.S. Appl. No. 14/559,850, filed Dec. 3, 2014, invented by Dr. Jens-Peter Akelbein et al., Total 22 pages.
Response to Office Action, dated Oct. 8, 2015, for U.S. Appl. No. 14/559,850, filed Dec. 3, 2014, invented by Dr. Jens-Peter Akelbein et al., Total 14 pages.
Notice of Allowance, dated Jan. 12, 2016, for U.S. Appl. No. 14/559,850, filed Dec. 3, 2014, invented by Dr. Jens-Peter Akelbein et al., Total 28 pages.

* cited by examiner

USING A LOCATION AUTHORIZATION EXTENSION TO PROVIDE ACCESS AUTHORIZATION FOR A MODULE TO ACCESS A COMPUTING SYSTEM

CROSS-REFERENCE TO RELATED FOREIGN APPLICATION

This application is a continuation of U.S. patent application Ser. No. 14/559,850, filed Dec. 3, 2014, which is a continuation of U.S. patent application Ser. No. 13/686,819, filed Nov. 27, 2012, issued as U.S. Pat. No. 8,990,899, granted Mar. 24, 2015, which is a non-provisional application that claims priority benefits under Title 35, United States Code, Section 119(a)-(d) from European Patent Application entitled CLOUD MAINTENANCE AND AUTHORIZATION, by Dr. Jens-Peter AKELBEIN and Wolfgang MUELLER-FRIEDT, having European Patent Application No. EP11191490.9, filed on Dec. 1, 2011, which United States and European Patent Applications and Patents are incorporated herein by reference in its entirety.

BACKGROUND OF THE INVENTION

1. Field of the Invention

Provided are a method, system, and computer program product for a local authorization extension to provide access authorization for a module to access a computing system.

2. Description of the Related Art

Today, many computing services are delivered as cloud services provided by a cloud computing center, in particular, a public cloud computing or private cloud computing centers, or simply cloud center. The cloud services may comprise techniques such as software-as-a-service, platform-as-a-service and/or infrastructure-as-a-service (IaaS). A public cloud system is typically operated by a cloud provider, which offers cloud services for private (business to consumer, B2C) or enterprise costumers (business to business, B2B) being referred to as cloud service consumers or customers. A trivial cloud service may be an access to a computing system with an operating system of any kind installed, which may be provided by the cloud service provider to the customer. Plain storage services may be provided out of storage clouds using standardized protocols like CIFS (Common Internet File System) and NFS (Network File System) or proprietary implementations. Normally, application services are provided on application-specific protocols. Very often, operating systems in cloud service centers may not run directly on physical computing systems, but on hypervisors.

Key concerns of using and consuming cloud services are security insufficiencies. Consumers of cloud services want their data to be protected. Cloud customers also want a stable computing environment, such that a system once set-up may not be stopped by service personal maintaining hardware components within a cloud computing center.

In order to provide high standards for security in cloud computing centers, several state-of-the-art technologies have been developed. Patent Cooperation Treaty (PCT) Patent Publication WO2010/059673 discloses systems, methods and apparatus for tunneling in a cloud-based security system. Management of tunnels, such as data tunnels, between enterprises and processing nodes for a security service is facilitated by the use of virtual gateway nodes and migration fail-over to minimize traffic impacts, when a tunnel is migrated from one processing node to another processing node.

U.S. Patent Publication No. 2011/0072486 discloses a system comprising one or more processors coupled to a memory and execution logic. A policy life cycle component is configured to maintain a repository of security policies. The repository of security policies comprises policies governing access to a virtual host and to a plurality of virtual machines running on the virtual host. The policy life cycle component is also configured to issue a compound policy for an identified virtual operating system running on the virtual host.

However, known systems for managing secure maintenance in a cloud computing environment may typically rely on methods known from non-virtualized computing centers.

SUMMARY

Provided are a method, system, and computer program product for a local authorization extension to provide access authorization for a module to access a computing system. A memory stores information on a first validity range comprising position coordinates for a module seeking to access the computing system and a second validity range comprising position coordinates for a location authorization extension for a computing system. A determination is made of a first position signal from a first receiver of the module and of a second position signal from a second receiver of the location authorization module. Determinations are made as to whether the first position signal is within the first validity range and whether the second position signal is within the second validity range. The module is granted access to the computing system in response to determining that the first position signal is within the first validity range and the second position signal is within the second validity range.

BRIEF DESCRIPTION OF THE DRAWINGS

Embodiments are described, by way of example only, and with reference to the following drawings.

DETAILED DESCRIPTION

Figure 1:
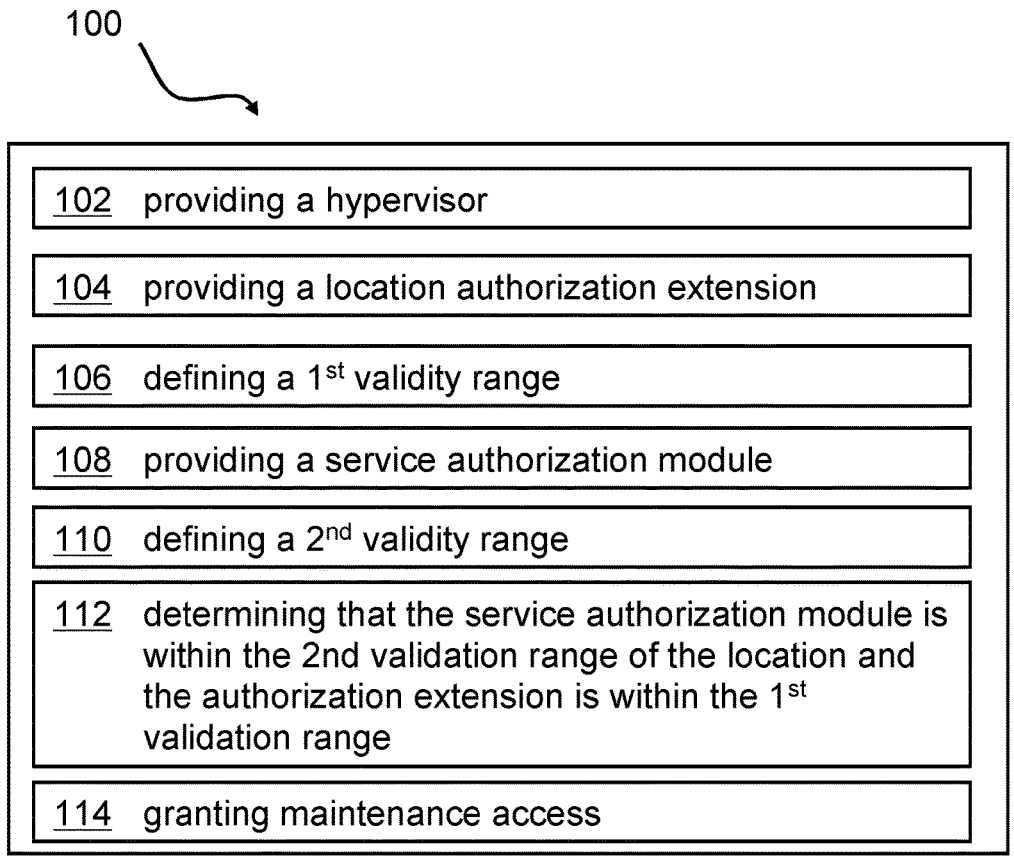
FIG. 1 shows a block diagram for an access authorization for maintenance to a computing system.

There is a need in the art for an improved method for accessing computing systems in a cloud environment, such that a high degree of security for the cloud service consumers is provided. This need may be addressed by the below described embodiments for maintenance to a computing system in a cloud environment, an access authorization system, location authorization extension, a computing system, and a computer program product according to the independent claims.

According to one embodiment, a method for an access authorization for maintenance to a computing system may comprise a hypervisor for controlling the computing system, a location authorization extension communicatively coupled to the computing system, in particular to a central processing unit (CPU) of the computing system, wherein the location authorization extension may comprise a first receiver for a global positioning system. Further provided is a first validity range for the location authorization extension and a service authorization module comprising a second receiver for the global positioning system.

Moreover, the method may comprise defining a second validity range for the service authorization module, and determining by the hypervisor, based on a first position signal from the first receiver and a second position signal of the second receiver, that the location authorization extension may be positioned within the first validity range, and that the service authorization module may be located within the second validity range wherein the service authorization module and the location authorization extension may be communicatively coupled. Finally, the method may comprise granting, under control of the hypervisor, physical access for maintenance to the computing system.

The maintenance may, in particular, be performed by service staff personal.

According to another embodiment, an access authorization system for an access authorization for maintenance to a computing system in a cloud environment may comprise a location authorization extension communicatively coupled to the computing system, wherein the location authorization extension may comprise a first receiver for a global positioning system, a hypervisor for controlling the computing system, a first defining unit adapted for defining a first validity range for the location authorization extension, and a second defining unit adapted for defining a second validity range for a service authorization module.

The service authorization module may comprise a second receiver for the global positioning system, wherein the service authorization module and the location authorization extension may be communicatively coupled. The hypervisor may be adapted for determining, based on a first position signal from the first receiver and a second position signal of the second receiver, that the location authorization module may be positioned within the first validity range, and that the service authorization module may be positioned within the second validity range. Furthermore, a granting unit may be present. The granting unit may be adapted for granting, under control of the hypervisor, physical access for maintenance to the computing system.

In a further embodiment, a location authorization extension is integrated into a central processing unit of a computing system and may comprise a receiver for a global positing system and a validation memory for storing a key and a validation range.

The communicative coupling between the service authorization module and the location authorization extension may be implemented based on a wire or wireless. In order to establish a by-wire-connection, the service authorization module may have to be plugged into a socket that may be electrically connected to the location authorization extension. If the first and the second validity range are identical, the service authorization module may need to be located within the first validity range and thus, in the validity range of the computing system.

Computing systems located in cloud computing centers may only be accessed for maintenance if the service personnel has a secure authentication, so that computing systems may not be stopped or shut-down by accident for maintenance purposes. Because cloud service consumers may typically be located remotely to the cloud computing center, a shut-down of a computer or a stop of a virtual machine that may actually be accessed by the cloud service consumer, may cause unforeseeable damage in the business relationship between the cloud service consumer and the cloud service provider. Certain of the described embodiments provide a secure way to protect computing systems as part of a cloud computing environment, such that these computing systems may not be subject to unauthorized access for maintenance tasks. Cloud computing service centers having several hundreds of computing systems may require maintenance and a wrong selection of a computing system for maintenance by service personnel may frequently occur. To avoid this problem, the cloud service consumer as well as the cloud service management center may be authorized based on geographical positions or ranges.

In the context of this application, the following conventions have been followed:

Access authorization—The term "access authorization" may denote a physical access to a computing system. The computing system may be installed in a cloud computing center. The computing system may be secured in a physical way, e.g., by a locked cabinet, rack, or any other kind of physical protection to a computing system. Authorization access to these systems may denote unlocking the mentioned equipment. Additionally, an access to the systems may be locked on a software level, such that a system management access task may be disabled.

Computing system—The term "computing system" may denote any computing system like server systems, components of a storage rack, blade systems installed in a rack system, tape systems or any other kind of equipment typically installed in computing centers, in particular cloud computing centers.

Hypervisor—The term "hypervisor" may denote a control program being installed on physical hardware of a computing system for running one or more virtual machines.

Location authorization extension—This term may denote a physical hardware extension to a computing system, in particular, to a central processing unit (CPU) of a computing system. The local authorization extension may physically be a part of, or linked to, a CPU at a hardware level or may be integrated on the main board or, alternatively, it may be provided as a removable component.

Global positioning system—The term "global positioning system" may denote a system that may allow a receiver for the global positioning system to determine its physical position on earth. This position may be related to a map being stored together with the receiver, such that a position may be marked on the map. However, in some cases, only geo-coordinates may be given.

Range—The term "range" may denote a physical environment in two or three physical dimensions. The range may be limited by a polygon, wherein the edges of the polygon may be defined or given, e.g., by geo-coordinates.

Service authorization module—The term "service authorization module" may denote a physical system that may be carried by maintenance personnel. The maintenance personnel may have the task to perform service jobs to computing systems—in the above sense—in a cloud computing center. The service authorization module may be a physical device comprising a global positioning system receiver and other electronic components for controlling and communication purposes. It may be instrumental for a secure authorized access to a computing system in the cloud computing center.

Cloud environment—The term "cloud environment" or "cloud computing environment" may denote several components: There may be a cloud computing center comprising a plurality of physical computing systems. In cloud computing environments, these computing systems may typically run a hypervisor each for controlling a plurality of operating systems on one physical computing system. Different applications may be controlled by the different operating systems. Cloud computing consumers may access the applications, or part of the applications, as services. On the cloud computing provider side, applications and services may be maintained as single or multi-tenant services, or applications. Cloud computing service consumers are typically not involved in any operation tasks of the software, the underlying infrastructure, the operating system or the hardware computing systems.

Maintenance—The term "maintenance" may denote the process of performing a service to a computing system. This may comprise exchanging a physical disk, cleaning a fan, exchanging a filter, replacing a memory board, or any other physical component of a computing system. Normally, maintenance means that the operation of the computing system may have to be stopped and eventually switched off. In the context of this document, maintenance may denote a physical access to a computing system.

In one embodiment, the communicative coupling between the service authorization module and the location authorization extension may be encrypted. This may have the advantage that non-authorized service personnel carrying a service authorization module that is not authorized to access the computing system having the location authorization extension may not be granted access to the computing system.

In another embodiment, the location authorization extension may comprise a validation memory adapted for storing a first key indicative of an image of a virtual machine to be executed under control of the hypervisor on the computing system, and for storing the first validity range together with the first key.

The key may, in particular, be an identifier for the image as well as an identifier to defined validity ranges for the image. The first validity range may be defined when setting up a computing center and/or physically installing the computing system. Thus, the location authorization extension may be stored at the location of the computing system. This may later be compared to an actual measured position by the global positioning system receiver of the computing system and/or the location authorization extension, respectively. If the position of the computing system may be outside the first validity range, maintenance access may be denied.

In a further embodiment, the validation memory may also be adapted for storing the second validity range together with the first key. Thus, the first key may be stored together with the first validity range and the second validity range. The second validity range may—as described above—be an allowed range for a service technician carrying the service authorization module. It may turn out that for each image for a virtual machine to be executed on the computing system one of such datasets comprising at least the first key, the first validity range and the second validity range may be stored in the validation memory of the location authorization extension. Thus, if the service personal is not within its respective range and the computing system is not located within its respective range, no maintenance access to the computing system—e.g., neither to the software nor to the hardware—may be granted.

The validation memory may be adapted for storing even more validity ranges. There may also be a third validity range for a service center controlling the operation of the computing system, as well as a fourth validity range that may be used for a customer of the services provided by the computing system and/or the executed image.

According to an alternative embodiment, the image of the virtual machine to be run under control of the hypervisor may be stored and/or transmitted to the hypervisor in an encrypted form, wherein a second key may be used for decryption. This may enhance the security of the system. Also, the second key may be stored within the dataset of the first key.

In a yet further embodiment, the first validity range as well as the second validity range may each be defined by coordinates of at least three different physical positions defining corners of the respective validity range, wherein the respective validity range may have a two-dimensional or three-dimensional shape. The shape may be two-dimensional, if three physical positions may be given, and may have a three-dimensional shape, if at least four physical positions may be given. The physical positions may have been determined by a receiver of a global positioning system. Alternatively, the range may have been defined by a central point that may have been determined by a global positioning system—and thus having geo-coordinates—and a surrounding, e.g., defined by a radius, using the position as a center or a corner. Alternatively, the range may be a rectangular with defined side lengths and a default position of the central point rectangular—e.g., in the middle, in one corner, etc.

In one embodiment, the virtual machine running on the hypervisor may be stopped based on an authorization code. The authorization code may be provided by a first authorization authority, which may be a control center for the computing system in a cloud computing center or—in short—a service center, which may control the cloud computing center comprising the computing system.

The authorization code may be provided to the hypervisor, e.g., wireless or by wire. The authorization code may comprise physical coordinates of the first authorization authority. This may guarantee that service personnel may access the computing system or its components, only if the physical coordinates of the cloud computing center may be located within a defined respective validity range—e.g., a third validity range—that may have been stored in the validation memory of the location authorization extension. Thus, the virtual machine of the computing system may only be stopped if the location authorization extension "authorizes" the cloud computing control center and the service personnel to access the computing system.

In an additional embodiment, the authorization code may comprise physical coordinates of a second authorization authority, in particular, a user of the computing system or the virtual machine. This may also allow codifying a physical position of a user or customer into the access method.

In a yet further embodiment, prior to the stopping of the virtual machine, a determination is made that the physical coordinates of the first authorization authority are positioned within a third validity range stored in the validation memory. Thus, the location authorization extension may control an access to the related computing system in a way that a remote access by a service center may only be granted if the service center may be positioned within a respective validity range, such as the third validity range, that may have been stored before in the validity memory. Based on this determination, the computing system may decide whether the service center may be authorized to access the computing system.

In a further embodiment, prior to the stopping of the virtual machine, a determination may be made that the physical coordinates of the second authorization authority may be positioned within a fourth validity range stored in the validation memory. Such a fourth validity range may be associated to a user or customer of the image of the computing system. Thus, physical access to the computing system or software access to applications and the virtual machine may be granted only if all physical positions, in particular, those of the computing system, i.e., the location authorization extension, the service authorization module, and the first and second authorization authorities, are determined to be located within their respective validity range stored in the validation memory.

Furthermore, a computer or computing system may comprise the access authorization module, as described above, the performs the method for access authorization. The computing system may be a component of a cloud computing center. The access authorization module may, in particular, be an extension to a CPU of a computing system.

In another embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

In the following, a detailed description of the figures will be given. All illustrations in the figures are schematic. Firstly, a block diagram of an embodiment of the inventive method for an access authorization for maintenance to a computing system may be given. Afterwards, embodiments of the method and an access authorization system will be described.

FIG. 1 shows a block diagram of an embodiment of a method 100 for an access authorization for maintenance to a computing system. The method 100 may comprise providing (at block 102) a hypervisor for controlling the computing system and providing (at block 104) a location authorization extension communicatively coupled to the computing system. The location authorization extension may comprise a first receiver for a global positioning system. The method may also comprise defining (at block 106) a first validity range for the location authorization extension, providing. At block 108, a service authorization module is provided comprising a second receiver for the global positioning system. At block 110, a second validity range is defined for a service authorization module. At block 112, the hypervisor determines based on a first position signal from the first receiver and a second position signal of the second receiver that the location authorization extension may be positioned within the first validity range and that the service authorization module may be located within the second validity range, wherein the service authorization module and the location authorization extension are communicatively coupled. At block 114, under control of the hypervisor, physical access is granted for maintenance to the computing system.

Figure 2A:
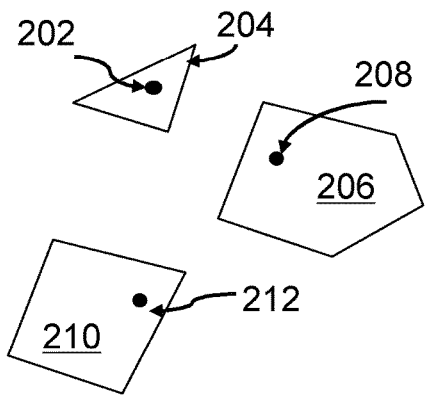
FIG. 2a and FIG. 2b show defined validity ranges.
Figure 2B:
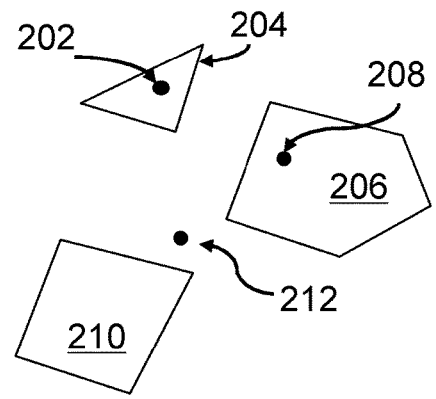

FIGS. 2a and 2b show defined ranges. Physical positions may be shown as 202, 208 and 212 and ranges surrounding these positions may be shown as 204, 206 and 210. FIG. 2a shows positions 202, 208, 212 within the ranges, while FIG. 2b shows position 212 outside its corresponding range 210. With respect to FIG. 2b, if 212 would be the position of the location service module and 210 may be the respective validity range, then the service technician, carrying the location service module, would not be within his defined validity range, e.g., the second validity range. In this case, an access to the computing systems and/or its components may be denied. In a similar form, access may not be granted, if position 212 in FIG. 2b may be the position of a customer such that the customer is not located within the defined validity range of a user or customer. In such case, the customer 212 in FIG. 2b may not be allowed to authorize access to a computing system.

Figure 3:
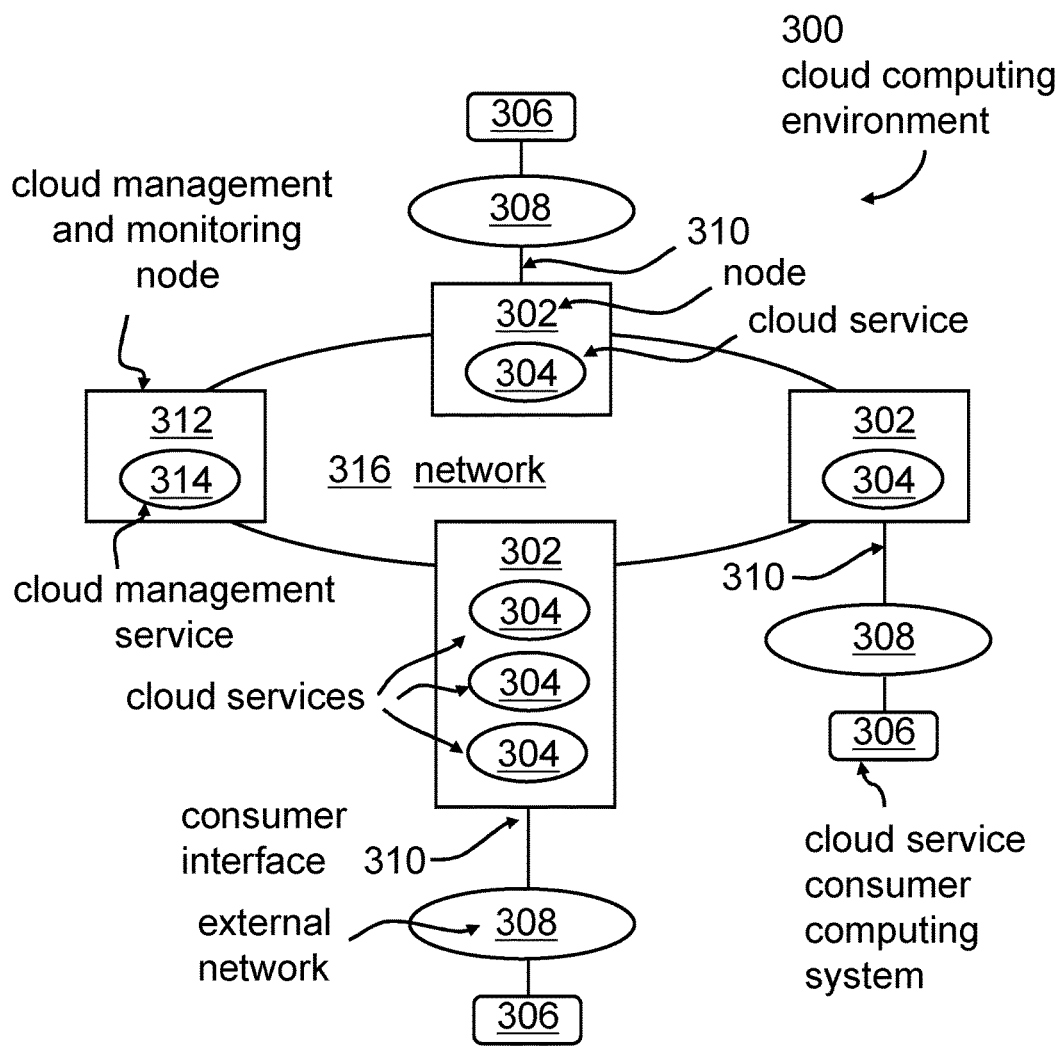
FIG. 3 shows a block diagram of a cloud computing environment.

FIG. 3 shows a block diagram of an embodiment 300 of a cloud computing environment. A user system 306, in particular a cloud service consumer computing system, may be connected via an external network 308 to a cloud computing node 302, which may provide a cloud service. For simplicity, different cloud services 304 in different nodes 302 of the cloud computing network 316 may have an identical reference numeral although the services may be different. The system 306 may access the cloud services via a cloud service interface 310. The external network 308 may be part of the same global network, e.g., the Internet. A cloud management and service node 312 may control and manage the different cloud services 304, the nodes 302 itself, access rights from different systems 306 to specific cloud services 304, maintenance schedules for different nodes 304 in the network 316, as well as virtual machines, operating systems and application programs (all not shown in FIG. 3) running on the different nodes 302. This may be shown in more detail in FIG. 4.

Figure 4:
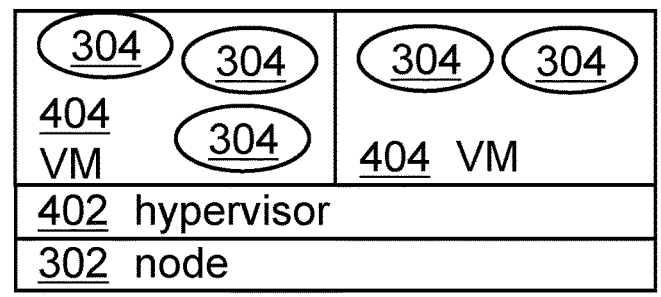
FIG. 4 shows a hypervisor setup.

FIG. 4 shows a typical hypervisor setup. The virtual machines 404 may function as a basis for providing different cloud services 304. A hypervisor 402 may run on top of each hardware node 302 and may be a basis for different virtual machines 404 on each node 302. Operating systems and application are not shown because they are known to a skilled person.

Figure 5:
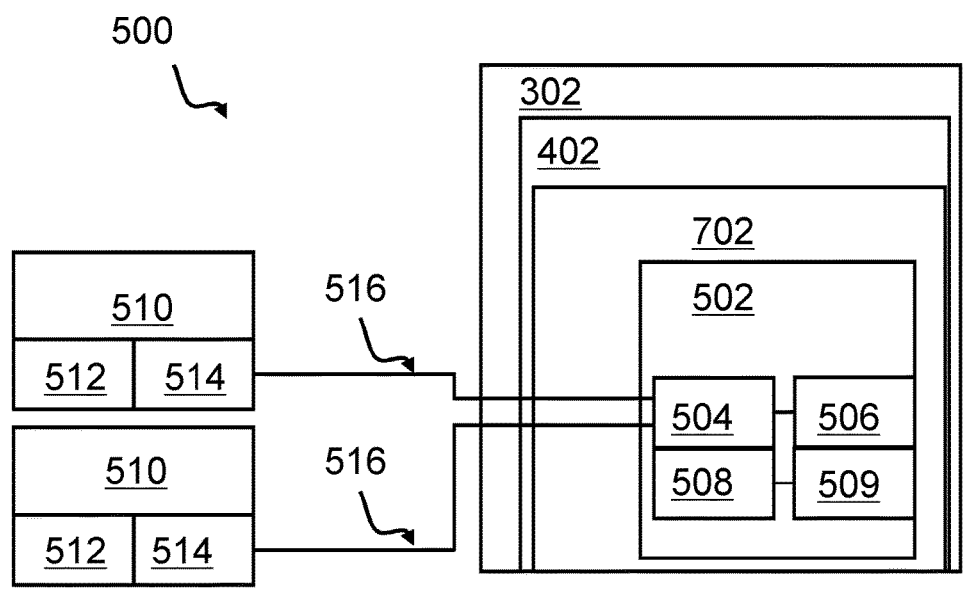
FIG. 5 shows embodiments of a location authorization extension and a service authorization module.

FIG. 5 shows embodiments of a location authorization extension 502 and a service authorization module 510 as a location authorization system 500. FIG. 5 shows also a hypervisor 402 running as a software program on a node 302. The hypervisor 402 may run on a computing processing unit (CPU) 702. The CPU 702 may be extended by a location authorization extension 502 (LAE) consisting of a location authorization logic 504, a location validation memory 506, an encryption module 508, and a receiver 509 for a global positioning system.

In addition, FIG. 5 shows an authorization module 510, which may be a service authorization module (SAM). The module 510 may comprise a position determination module, or receiver 512, e.g., adapted for receiving signal of a global positioning system and determining its own position, and an encryption module 514. Both instances 508 and 514 of encryption modules may ensure a secure and trusted transmission 516 of position information and authorization information between 502 and 510. Prior art encryption technologies may be used. Several service technicians may carry their own service authorization module.

The location authorization extension 502 may provide an instruction set as a location authorization extension application programming interface (LAE API) for creating, validating, and deleting location-aware handling of virtual images. The LAE API may be used by the hypervisor program 120.

The LAE API may define a number of parameters for an instruction set.
1. Key1 (=first key): A unique identifier created by the LAE in conjunction with a list of location ranges. Key1 may have a 1:1 relationship with the list of location ranges.
2. Key2 (=second key): A unique key created by the LAE out of a list of positions. The Key2 may be used by the hypervisor for encrypting the image of a virtual system. An encryption of virtual systems prevents from utilizing the image without former authorization.
3. Ret: Binary value [0|1] as return code indicating the success of an operation
4. {list of location ranges} A list of one or multiple ranges each being defined as a list of at least three or more physical positions being defined as edges of a two-dimensional or three-dimensional range.
5. {list of SAM positions} A list of one or multiple physical positions. The positions may be provided in an encrypted format to be exchanged between 508 and 514.

The following instruction set may be required by the LAE API.

Key1=Create_Image_Localization ({list of location ranges}): may store a list of location ranges in validation memory 506 including a generated Key1 as a dataset, and may return Key1. A Zero key may be interpreted as failure of the instruction.

Ret=Update_Image_Localization ({list of location ranges}): may update a list of location ranges in 506 being stored in a dataset identified by Key1. Ret may return instruction results.

The function Key2=Set_Image_Localization (Key1, [Key2], {list of SAM positions}) may generate the Key2. It may authenticate a list of SAM positions with a list of location ranges previously being stored. The dataset containing the list of location ranges may be addressed by Key1. The instruction may generate a Key2 to be used as an encryption key outside the LAE. Key2 may be stored in the same dataset. The Key2 may be returned by the instruction. A Zero key may be interpreted as failure of the instruction The function Key2=Get_Image_Localization (Key1, {list of SAM positions}) may return the Key2 for decryption. It may authenticate a list of SAM positions with a list of location ranges previously being stored. The dataset containing the list of location ranges may be addressed by Key1. The instruction may return a previously generated Key2 being stored in the dataset. A Zero key may be interpreted as failure of the instruction.

Ret=Delete_Image_Localization (Key1, {list of SAM positions}). It may authenticate a list of SAM positions with a list of location ranges previously being stored. It may delete the dataset identified by Key1 and previously being stored in 506. It may return instruction results.

The following table may illustrate an embodiment of an organization of keys and ranges in the validation memory.

| Dataset 1 | #1 key1 | #1 key2 | #1 {list of location ranges} |
| Dataset 2 | #2 key1 | #2 key2 | #2 {list of location ranges} |
| Dataset 3 | #3 key1 | #3 key2 | #3 {list of location ranges} |
| ... | | | |
| Dataset n | #1 key1 | #1 key2 | #n {list of location ranges} |

The hypervisor and/or a granting unit, respectively, may only allow a physical access to the computing system for maintenance if the cloud service center may be within a predefined range stored within the validation memory of the location authorization extension. The same applies to a cloud service customer. The cloud service customer signals a geo-position which in turn may be compared to a predefined position and a determination is made as to whether this position may be located with a defined range of a customer. Thus, maintenance access may only be granted if all three, the customer, the cloud service center, and the service personal identifiable and locatable by the service authorization module may be within the ranges pre-defined and stored in the validation memory, which may be part of the access authorization extension.

Figure 6:
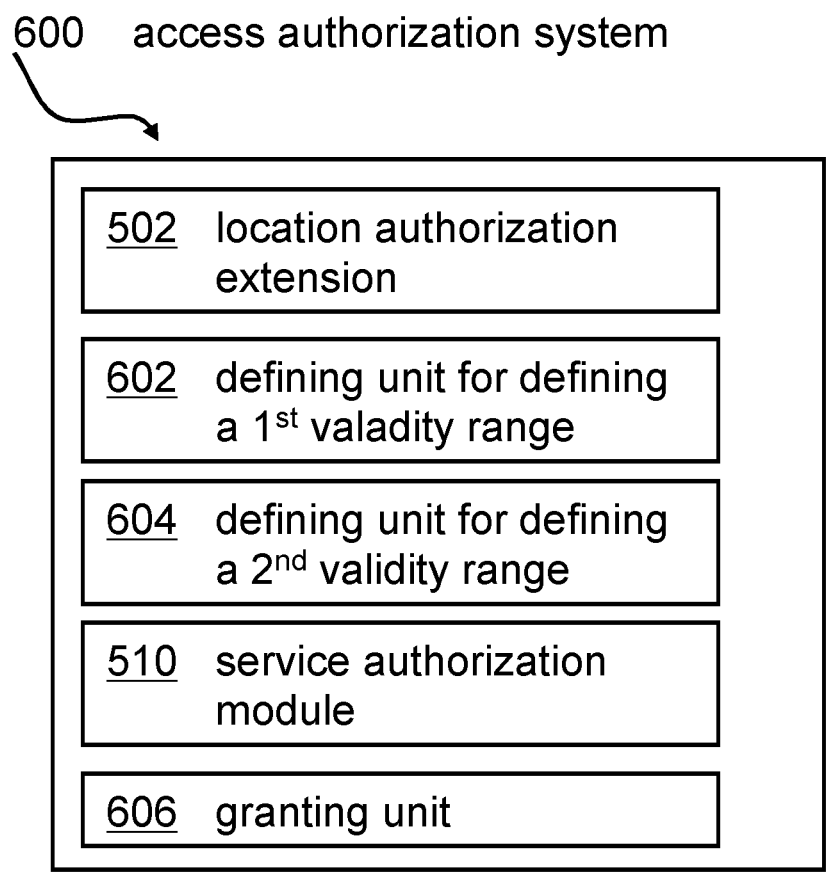
FIG. 6 shows an embodiment of an access authorization system.

FIG. 6 shows an embodiment of an access authorization system 600 for an access authorization for maintenance to a computing system in a cloud environment. The access authorization system 600 may comprise a location authorization extension 502 communicatively coupled to the computing system. The location authorization extension 502 may comprise a first receiver for a global positioning system, a first defining unit 602 adapted for defining a first validity range for the location authorization extension 502, a second defining unit 604 adapted for defining a second validity range for a service authorization module 510. The service authorization module 510 may comprise a second receiver for the global positioning system. The service authorization module 510 and the location authorization extension 502 are communicatively coupled. The hypervisor, controlling the computing system, is adapted for determining based on a first position signal from the first receiver and a second position signal of the second receiver that the location authorization module 502 is positioned within the first validity range and that the service authorization module 510 is positioned within the second validity range. A granting unit 606 is adapted for granting, under control of the hypervisor, physical access for maintenance to the computing system.

Figure 7:
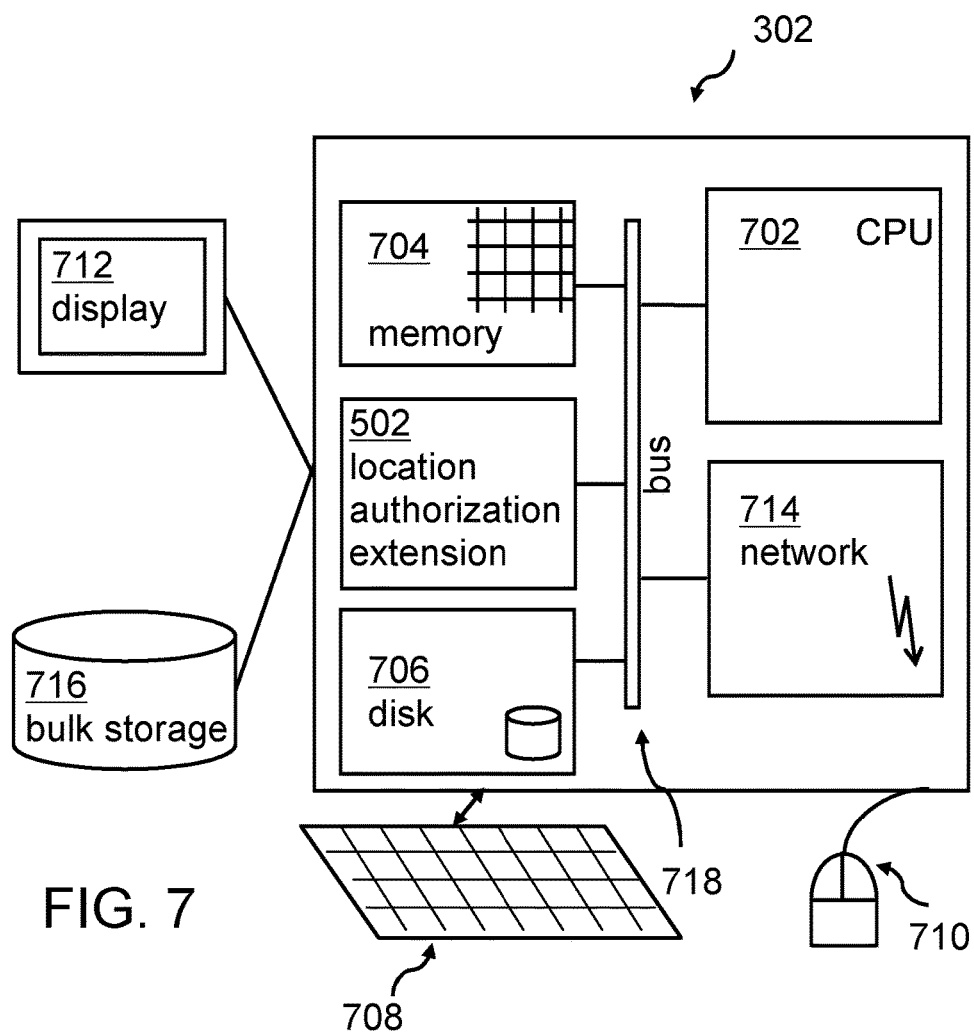
FIG. 7 shows a computing system comprising the access authorization system.

Embodiments may be implemented together with virtually any type of computer, regardless of the platform being suitable for storing and/or executing program code. For example, as shown in FIG. 7, a computer system 700, which may be functional identical to the cloud computing node 202 of FIG. 2, may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities, typical of today's computers (not shown). The memory elements 704 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, the access authorization extension 502—may be attached to the bus system 718. It may alternatively be implemented as integral component of the processor 702.

The computer system 700 may also include input means, such as a keyboard 708, a pointing device such as a mouse 710, or a microphone (not shown). Furthermore, the computer 700, may include output means, such as a monitor or screen 712 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

Figure 8:
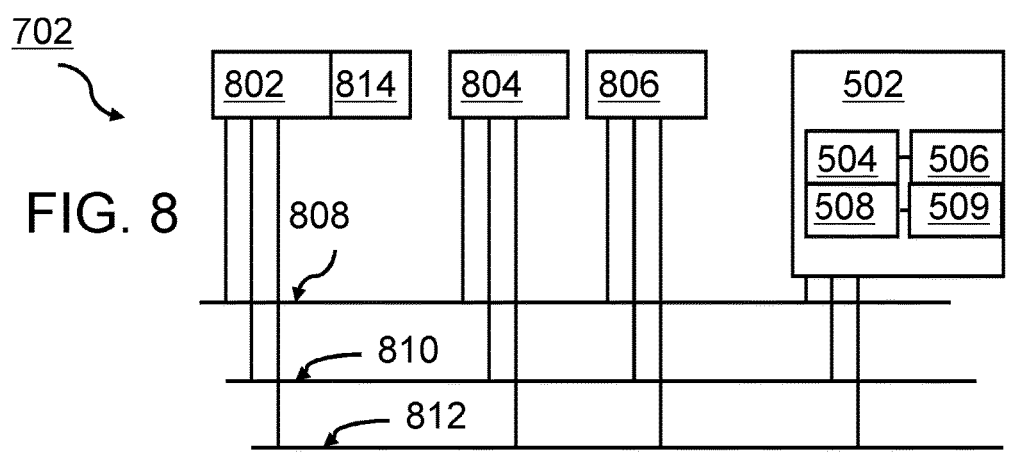
FIG. 8 shows a link between a location authorization extension and a CPU.

FIG. 8 shows an embodiment of a link between a location authorization extension and a CPU. A typical CPU 702 may consist of the control unit 802, an arithmetic logical unit ALU 804, an input/output module 806, a control bus 808, an address bus 810, and a data bus 812 as implemented in a von-Neumann-architecture. Numerous implementations, optimizations, and processor extensions may be known from prior art.

The CPU 702 may be extended by a location authorization extension LAE 502 comprising components 504, 506, 508 and 509 as explained above. The control unit 802 of a CPU may be extended by the instruction set 814 for the LAE. The instruction set 814 may provide individual processor instructions for implementing the execution of each LAE instruction as defined above.

In a further embodiment, one or more elements of the aforementioned computer system 700 may be located at a remote location and connected to the other elements over a network. Further, embodiments may be implemented on a distributed system having a plurality of nodes, where each portion of the invention may be located on a different node within the distributed system. In one embodiment, the node corresponds to a computer system. Alternatively, the node may correspond to a processor with associated physical memory. The node may alternatively correspond to a processor with shared memory and/or resources or a smart phone.

Further, software instructions to perform certain of the embodiments may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

What is claimed is:

1. A method, comprising:
   storing in a memory information on a first validity range comprising position coordinates for a service authorization module seeking to access a computing system, wherein the first validity range defines position coordinates of an allowed range for a service technician having the service authorization module;
   storing in the memory information on a second validity range comprising position coordinates for a location authorization extension for a computing system, wherein the second validity range defines position coordinates where the computing system is located when setting-up or installing the computing system;
   determining from a first receiver of the service authorization module a first position signal;
   determining from a second receiver of the location authorization extension a second position signal;
   determining from the first position signal whether the service authorization module is within the first validity range;
   determining from the second position signal whether the location authorization extension is within the second validity range;
   transmitting, with one or more encryption modules, position information and authorization information between the service authorization module and the location authorization extension to ensure a secure and entrusted transmission; and
   granting the service authorization module access to the computing system in response to determining that the service authorization module is within the first validity range and the location authorization extension is within the second validity range.

2. The method of claim 1, wherein the service authorization module comprises a device having the first receiver that is carried by the service technician seeking authorized access to perform maintenance on the computing system.

3. The method of claim 1, wherein the computing system comprises a virtual machine, and wherein the determining whether the first and second position signals are within the first and second validity ranges, respectively, and granting the service authorization module access are performed by a hypervisor controlling the computing system.

4. The method of claim 3, wherein a service center sends a command to the hypervisor to stop the virtual machine and wherein the service authorization module is granted access to the virtual machine are performed in response to receiving the command to stop the virtual machine.

5. The method of claim 3, further comprising:
storing in the memory information on a third validity range for a first authorization authority and a fourth validity range for a second authorization authority;
determining a third and fourth position signals from the first and second authorization authorities, respectively; and
determining whether the third and the fourth position signals are within the third and fourth validity ranges, respectively, wherein the access is granted in response to determining that the first, second, third and fourth position signals are within the first, second, third and fourth validity ranges, respectively.

6. A system in communication with a service authorization module having a first receiver, comprising:
a computing system;
a location authorization extension coupled to the computing system, including:
a second receiver;
a memory including information on a first validity range comprising position coordinates for the service authorization module and a second validity range comprising position coordinates for a location authorization extension, wherein the first validity range defines position coordinates of an allowed range for a service technician having the service authorization module, and wherein the second validity range defines position coordinates where the computing system is located when setting-up or installing the computing system;
location authorization extension for performing operations, the operations comprising:
determining from a first receiver a first position signal of the service authorization module;
determining from a second receiver a second position signal of the location authorization extension;
determining from the first position signal whether the service authorization module is within the first validity range;
determining whether the second position signal is within the second validity range; and
granting the service authorization module access to the computing system in response to determining that the service authorization module is within the first validity range and the location authorization extension is within the second validity rang;
an encryption module for transmitting position information and authorization information between the service authorization module and the location authorization extension to ensure a secure and entrusted transmission.

7. The system of claim 6, wherein the service authorization module comprises a device having the first receiver that is carried by the service technician seeking authorized access to perform maintenance on the computing system.

8. The system of claim 6, wherein the computing system comprises a virtual machine, and wherein the operations of determining whether the first and second position signals are within the first and second validity ranges, respectively, and granting the service authorization module access are performed by a hypervisor controlling the computing system.

9. The system of claim 8, wherein a service center sends a command to the hypervisor to stop the virtual machine and wherein the service authorization module is granted access to the virtual machine in response to receiving the command to stop the virtual machine.

10. The system of claim 8, wherein the operations further comprises:
storing, in the memory, information on a third validity range for a first authorization authority and a fourth validity range for a second authorization authority;
determining a third and fourth position signals from the first and second authorization authorities, respectively; and
determining whether the third and the fourth position signals are within the third and fourth validity ranges, respectively, wherein the access is granted in response to determining that the first, second, third and fourth position signals are within the first, second, third and fourth validity ranges, respectively.

11. The system of claim 6, further comprising:
a bus, wherein the location authorization extension communicates with the computing system over the bus.

12. A computer program product accessible from a computer readable storage device including code to implement a location authorization extension for authenticating a service authorization module having a first receiver to access a computing system, wherein the code is in communication with a memory and a second receiver and executed to perform operations, the operations comprising:
storing, in the memory, information on a first validity range comprising position coordinates for the service authorization module, wherein the first validity range defines position coordinates of an allowed range for a service technician having the service authorization module;
storing information in the memory on a second validity range comprising position coordinates for the location authorization extension, wherein the second validity range defines position coordinates where the computing system is located when setting-up or installing the computing system;
determining from the first receiver a first position signal;
determining from a second receiver of the location authorization extension a second position signal;
determining from the first position signal whether the service authorization module is within the first validity range;
determining from the second position signal whether the location authorization extension is within the second validity range;
transmitting, with one or more encryption modules, position information and authorization information between the service authorization module and the location authorization extension to ensure a secure and entrusted transmission; and
granting the service authorization module access to the computing system in response to determining that the service authorization module is within the first validity range and the location authorization extension is within the second validity range.

13. The computer program product of claim 12, wherein the service authorization module comprises a device having the first receiver that is carried by the service technician seeking authorized access to perform maintenance on the computing system.

14. The computer program product of claim 12, wherein the computing system comprises a virtual machine, and wherein the operations of determining whether the first and second position signals are within the first and second validity ranges, respectively, and granting the service authorization module access are performed by a hypervisor controlling the computing system.

15. The computer program product of claim 14, wherein a service center sends a command to the hypervisor to stop the virtual machine and wherein the service authorization module is granted access to the virtual machine in response to receiving the command to stop the virtual machine.

16. The computer program product of claim 14, further comprising:
- storing, in the memory information, on a third validity range for a first authorization authority and a fourth validity range for a second authorization authority;
- determining a third and fourth position signals from the first and second authorization authorities, respectively; and
- determining whether the third and the fourth position signals are within the third and fourth validity ranges, respectively, wherein the access is granted in response to determining that the first, second, third and fourth position signals are within the first, second, third and fourth validity ranges, respectively.

* * * * *